United States Patent [19]

Mohan et al.

[11] 4,268,415

[45] May 19, 1981

[54] REGENERATION OF SPENT HYDRODESULFURIZATION CATALYSTS WITH HETEROPOLY ACIDS AND HYDROGEN PEROXIDE

[75] Inventors: Raam R. Mohan, Berkley Heights; Bernard G. Silbernagel, Scotch Plains; Gopal H. Singhal, Westfield, all of N.J.

[73] Assignee: Exxon Research & Engineering Co., Florham Park, N.J.

[21] Appl. No.: 59,071

[22] Filed: Jul. 19, 1979

Related U.S. Application Data

[63] Continuation of Ser. No. 938,797, Sep. 1, 1978, abandoned.

[51] Int. Cl.$^3$ .................. B01J 23/94; B01J 23/92; B01J 21/20; C10G 23/02
[52] U.S. Cl. .................. 252/413; 208/216 R; 252/412; 252/414; 423/68; 423/150
[58] Field of Search ............ 252/411 S, 412, 413, 252/414, 416; 208/216 R, 216 PP; 423/68, 150

[56] References Cited

U.S. PATENT DOCUMENTS

| | | | |
|---|---|---|---|
| 2,547,380 | 4/1951 | Fleck | 252/465 |
| 3,259,588 | 7/1966 | Harvey et al. | 252/412 |
| 3,403,111 | 9/1968 | Colgan et al. | 208/216 |
| 3,562,150 | 2/1971 | Hamilton et al. | 252/412 |
| 3,635,838 | 1/1972 | Gatsis | 252/413 |
| 3,791,989 | 2/1974 | Mitchell et al. | 252/413 |
| 4,066,574 | 1/1978 | Tamm | 208/216 R |
| 4,083,771 | 4/1978 | O'Hara | 208/216 R |

FOREIGN PATENT DOCUMENTS 644239  10/1950  United Kingdom ............... 252/413

*Primary Examiner*—P. E. Konopka
*Attorney, Agent, or Firm*—D. W. Collins; Edward M. Corcoran

[57] ABSTRACT

Contacting deactivated hydrodesulfurization catalyst, such as Co-Mo supported on alumina, with a heteropoly acid, such as molybdophosphoric acid or tungstosilicic acid, to which dilute hydrogen peroxide is added, results in a significant enhancement in the rate and extent of carbon and metals removal. Forms of deposited vanadium intractable by other treatments are also removed. The process results in substantially complete regeneration of catalytic activity.

19 Claims, No Drawings

REGENERATION OF SPENT HYDRODESULFURIZATION CATALYSTS WITH HETEROPOLY ACIDS AND HYDROGEN PEROXIDE

This is a continuation of application Ser. No. 938,797, filed Sept. 1, 1978 now abandoned.

BACKGROUND OF THE INVENTION

1. Field of the Invention

The present invention is related to regeneration of spent catalysts used in hydrofining operations, and, more particularly, to the regeneration of spent catalysts employed in hydrodesulfurization and hydrodenitrogenation by treatment with a heteropoly acid and hydrogen peroxide.

2. Description of the Prior Art

As is well-known,, hydrodesulfurization of, e.g., petroleum fractions, is carried out employing an alumina catalyst support impregnated with Group VIB and VIII metals such as molybdenum and cobalt. While such catalysts are extremely useful in reducing sulfur content, the effectiveness of these catalysts is diminished during the course of processing as a result of two problems. First, carbon residues (coke) deposit on the surface of the catalyst, thereby reducing the effective surface area and pore size for catalytic activity. Second, heavy metals in the feedstock, such as nickel and, more importantly, vanadium, tend to poison the catalyst, again resulting in reduced catalytic activity. During the course of processing, the temperature is generally increased at a predetermined rate in order to compensate for the coking and poisoning effects. However, as the temperature is increased, a greater percentage of the feedstock is cracked, thereby resulting in a decrease of desirable product. Further, the increase in processing temperature results in an increase in the deposition rate of carbon residues.

Regeneration of spent catalysts has been the subject of much investigation and, consequently, a number of approaches for regenerating hydrodesulfurization catalysts have been developed. In particular, acidic media, such as mineral acids, anhydrous HF, oxalic acid and other carboxylic acids and acidified amine solutions, and oxidizing media, such as hydrogen peroxide, have been employed. However, such methods either (1) result in removal of unacceptable amounts of catalytically active metals, e.g., cobalt and molybdenum, as well as some solubilization of the support material, e.g., alumina, or (2) do not regenerate a sufficiently high degree of catalytic activity, so that catalytic activity of the regenerated catalyst is considerably inferior to that of fresh catalyst.

SUMMARY OF THE INVENTION

In accordance with the invention, spent catalyst which has been used in hydrofining of hydrocarbon feedstock is regenerated by contacting the spent catalyst wih a solution of a heteropoly acid containing about 1 to 50 wt. % hydrogen peroxide, based on the concentration of the heteropoly acid. The method disclosed results in the extraction of about 70 to 100% vanadium, about 90% nickel and about 50% cobalt, with essentially no loss of molybdenum and aluminum and with preservation of the structural integrity of the support. Extraction of metals is accompanied by partial removal of sulfur and by substantial increase in pore volume and surface area.

Additional processing by doping the demetallized catalyst with cobalt followed by calcination markedly promotes carbon decoking, further sulfur removal and additional increase in surface area and pore volume. Hydrofining activity and product selectivity of the regenerated spent catalyst is substantially the same as that of fresh catalyst.

DETAILED DESCRIPTION OF THE INVENTION

Regeneration of substantially complete catalytic activity in spent hydrodesulfurization catalysts is accomplished by contacting spent catalyst with a solution of a heteropoly acid and hydrogen peroxide under mild conditions of pH, temperature and agitation. The amount of hydrogen peroxide is about 1 to 50 wt. % based on the concentration of the acid.

The hydrodesulfurization catalysts which may be treated in accordance with the invention include those supported catalysts having Group VIB and VIII metals, including nickel, cobalt, tungsten and molybdenum and combinations of these. The metals may be in elemental, oxide or sulfide form or any combination thereof. The support may be any refractory oxide or other inert support, including alumina.

The spent catalyst may be pre-cleaned with an organic solvent to remove contaminating surface oils prior to contact by the solution of the heteropoly acid and hydrogen peroxide. Alternatively, spent catalyst may be contacted by both organic solvent and heteropoly acid plus hydrogen peroxide substantially simultaneously.

The organic solvent can vary over a wide range of hydrocarbons comprising aliphatics, aromatics, cyclo-paraffins or mixtures of these, preferably boiling below about 250° C. Examples of suitable organic solvents include decane, benzene, toluene, xylene, cyclohexane, and tetralin. Cracked naphtha can also be used. The object of the solvent extraction process is to render the surface and the bulk of the catalyst more accessible to the heteropoly acid/hydrogen peroxide solution, and thereby effect efficient removal of the contaminating metals, e.g., vanadium and nickel.

Contacting the spent catalyst with heteropoly acid/hydrogen peroxide may be accomplished employing any of the contacting processes usually used in petroleum processing, such as in a stationary phase or mildly agitated condition or in a plug flow reactor or in a continuous moving concurrent or counter-current liquid-solid bed reactor. The temperature of the process ranges between ambient to about 80° C., and preferably about 30° to 60° C., to maintain the stability and concentration of the heteropoly anion and the hydrogen peroxide.

An aqueous solution of the heteropoly acid/hydrogen peroxide is preferably employed. The concentration of heteropoly acid in aqueous solution ranges from about 0.1 to 25 wt. %, and preferably about 0.2 to 6 wt. %.

The concentration of hydrogen peroxide ranges from about 1 to 50 wt. %, and preferably about 3 to 15 wt. %, and most preferably about 15 wt. %, based on the amount of heteropoly acid. Conveniently, the volume ratio of heteropoly acid to hydrogen peroxide is about 100:1 v/v, employing prediluted hydrogen peroxide to form a solution having the final concentration given above. The concentrations of the heteropoly acid and hydrogen peroxide are chosen on the basis of the loading of the toxic metal contaminants, with higher concentrations being associated with higher concentrations of contaminants.

The pH of the solution ranges from about 1 to 3, and preferably about 1.5 to 2.5, to maintain stability of both the heteropoly acid and hydrogen peroxide in solution.

The spent catalyst is contacted with the heteropoly acid/hydrogen peroxide solution for about 4 to 200 hours, and preferably about 10 to 50 hours, depending upon the amount of metals to be removed. The longer times are associated with higher concentrations of contaminants. In general, the extraction is usually substantially complete within about 24 hours. The heteropoly acid/hydrogen peroxide solution may be optionally replaced with fresh solution at suitable intervals, such as about 10 hours, to accelerate removal of the contaminating metals.

Heteropoly acids useful in the practice of the invention have the general formula $H_x(YM_{12}O_{40})$, where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent (P, As) and x is 4 when Y is tetravalent (Si, Ti, Ge, Zr, Ce, Th). Up to one-half of M may be replaced by at least one element selected from the group consisting of nickel, cobalt and vanadium. During recrystallization of a heteropoly acid, a hydrated species of the acid is usually obtained, as is well-known. The number of water molecules depends on the particular process of recrystallization of the heteropoly acid and, while typically ranging from about 5 to 50, is not critical. Examples of heteropoly acids useful in the practice of the invention include molybdophosphoric acid, $H_3(PMo_{12}O_{40})$, molybdosilicic acid, $H_4(SiMo_{12}O_{40})$, tungstosilicic acid, $H_4(SiW_{12}O_{40})$, and tungstophosphoric acid, $H_3(PW_{12}O_{40})$.

For Co-Mo/Al$_2$O$_3$ catalysts, a molybdenum-containing heteropoly acid is preferred, since it has been found that heteropoly acid/hydrogen peroxide treatment incorporates molybdenum in the Al$_2$O$_3$ support in a dispersed manner without phosphorus overloading. An example of a heteropoly acid particularly useful in the practice of the invention is molybdophosphoric acid (MPA) having the general formula $H_3(PMo_{12}O_{40}).nH_2O$, for example, $H_3(PMo_{12}O_{40}).36H_2O$.

The method disclosed above results in the extraction of about 70 to 100% vanadium, about 90% nickel and about 50% cobalt, together with substantial increase in both surface area and pore volume of the catalyst. The alumina-based support remains essentially unchanged. This process also results in molybdenum loading on the support in a well-dispersed manner without aggregation or cluster formation. Surprisingly, excess phosphorus loading is avoided by the process of the invention. Finally, the extraction of vanadium, nickel and and cobalt results in a substantial reduction in sulfur build-up in the catalyst. While not subscribing to any particular theory, it appears that the reduction is due to removal of sulfur in the form of oxysulfides, oxysulfites or oxysulfates of the metals.

The process of the invention is particularly efficacious in removing certain vanadium species which are largely unaffected by other processes. For example, the combination of molybdophosphoric acid and hydrogen peroxide results in the oxidation of compounds containing vanadyl species ($VO^{2+}$) by a factor of three times as compared with molybdophosphoric acid treatment alone. Such vanadyl species are generally formed on the catalyst during the course of the hydrodesulfurization process, and their removal is important. Without subscribing to any particular theory, it appears that the hydrogen peroxide provides several benefits. First, hydrogen peroxide apparently helps maintain the heteropoly acid in the highest oxidation state. Otherwise, vanadium species, in being oxidized from lower to higher states, would reduce the heteropoly acid, thus adversely affecting its extracting capabilities. Second, hydrogen peroxide apparently assists in oxidizing $V^{4+}$ to $V^{5+}$, $VO^{2+}$ to $V_2O_5$ and $V_2S_3$ to $VOSO_4$, all of which higher oxidation species are more soluble and hence more extractable by the heteropoly acid.

Use of the heteropoly acid/hydrogen peroxide solution of the invention also results in a significant increase in both rate and extent of carbon radical generation. While a three-fold increase in carbon radical density accompanies treatment with only a heteropoly acid such as molybdophosphoric acid, addition of hydrogen peroxide leads to a higher carbon radical level at a faster rate. The increased carbon radical level apparently indicates breaking of the carbon "crust" on the catalyst surface, again facilitating extraction of contaminating metals.

As described above, the process results in substantial removal of metals which tend to poison the catalyst, with consequent removal of other contaminants such as sulfur and concommitant regeneration of catalytic acitivity. However, it has also been found that one-time (1×) impregnation of the catalyst with a cobalt salt following treatment with the heteropoly acid/hydrogen peroxide solution, followed by calcination at moderate temperatures of about 450° C. or less in air, results in the substantial removal of carbon as well as further removal of sulfur, together with a further increase in pore volume and surface area of the catalyst, and accordingly is preferred.

Cobalt impregnation may be accomplished using water soluble cobalt salts, preferably sulfur-free water soluble cobalt salts, such as cobalt nitrate and cobalt acetate. Impregnation may be done by the well-known techniques of incipient wetness, absorption from solution or evaporation of the salt onto the catalyst. Because of ease of operation, the incipient wetness technique is preferred.

The calcination is carried out for about 2 to 15 hours, preferably about 3 to 6 hours, in an oxidizing atmosphere, such as air, in order to maintain support integrity and to facilitate coke removal. The cobalt salt is oxidized to a cobalt oxide and carbon is oxidized to gaseous oxides of carbon. Moderate calcination temperatures reduce the risk of formation of localized hot spots, which would otherwise result in fracture of the catalyst support. However, higher temperatures may be employed by carefully controlling the oxygen content of the atmosphere, as is well-known in the art. A second (2×) cobalt impregnation followed by a second calcination under the conditions given above result in essentially complete removal of carbon and sulfur from the catalyst, and accordingly is most preferred.

Analogous nickel salts may alternatively be employed to impregnate nickel in HDS catalysts such as Ni-Mo/Al$_2$O$_3$.

Metals such as nickel, cobalt, vanadium and the like solubilized by the heteropoly acid/hydrogen peroxide solution can be recovered by conventional solvent extraction, ion exchange or chelation technology. Metals so recovered can be used in the impregnation process (e.g., Co and Co-Mo/$Al_2O_3$ catalysts) or for the manufacture of fresh catalysts. In place of cobalt salts, nickel salts can also be used to aid in coke burning and to provide catalysts containing primarily Ni-Mo/$Al_2O_3$, which are suitable for hydrodenitrogenation reaction in addition to possessing HDS activity.

EXAMPLES

Example 1—Hydrogen Peroxide Enhancement of Carbon Radical Generation

Samples of small pore Co-Mo/$Al_2O_3$ spent hydrotreating catalyst from the Amuay refinery used for hydrodesulfurization in Exxon's GO-FINING process were subjected to treatments of varying duration with dodecamolybdophosphoric acid (MPA) and with or without added hydrogen peroxide. When added, the amount of peroxide employed was 3 wt. % of the total MPA present. An aqueous solution of MPA (0.4 wt. %) of pH 2.3 was employed. The carbon radical density per unit volume of catalyst was determined by paramagnetic resonance observations. Table I below sets forth the relative carbon radical density, with the starting material assigned a value of unity.

TABLE I

| RELATIVE CARBON RADICAL DENSITY | | | |
|---|---|---|---|
| MPA | | MPA + 3 wt. % $H_2O_2$ | |
| Time (hrs) | Radical Density (relative units) | Time (hrs) | Radical Density (relative units) |
| 0 | 1.0 | 0 | 1.0 |
| 4 | 4.8 | 2 | 7.2 |
| 20 | 6.0 | 4 | 10.0 |
| 28 | 5.4 | 6 | 9.8 |
| 50 | 7.5 | 20 | 16.3 |
| 72 | 6.6 | 28 | 18.4 |

Clearly, use of hydrogen peroxide in conjunction with the heteropoly acid increased the carbon radical density. While not subscribing to any particular theory, the increased carbon radical density suggests that the carbon "crust" on the catalyst surface is more readily broken in the presence of the peroxide, thereby facilitating more rapid extraction of contaminating metals by the heteropoly acid.

Example 2—Metals Removal Improved by Hydrogen Peroxide Addition

Magnetic resonance techniques were used to monitor levels of different vanadium species on spent hydrotreating catalysts. As shown in Table II below, $V_2S_3$ species were very readily extracted by treatment with MPA alone. Other species, such as the surface species and $VO^{2+}$ associated with $Al_2O_3$, were much less tractable. After treatment in the aqueous solution of heteropoly acid plus 3 wt. % $H_2O_2$ of Example 1, however, the concentration of the surface species was reduced to a small fraction of its total value and the concentration of the $VO^{2+}$ species was also appreciably reduced. It should be noted that the reduction in surface species and $VO^{2+}$ species occurred in a much shorter time employing the heteropoly acid/hydrogen peroxide solution, as compared to heteropoly acid solution alone.

TABLE II

| AMOUNT OF VANADIUM REMOVED | | | |
|---|---|---|---|
| | Vanadium Type | | |
| | Vanadium Sulfide | Surface Species | $VO^{2+}$ Species |
| Spent Large Pore Catalyst, Residuum Feed: | | | |
| -Before MPA Treatment | 7 wt. % | 5 wt. % | 1 wt. % |
| -After MPA Treatment (90 hrs.) | <0.5 wt. % | 3 wt. % | 1 wt. % |
| Spent Small Pore Catalyst, GO-FINING Feed | | | |
| -Before MPA + $H_2O_2$ Treatment | — | 5 wt. % | 1 wt. % |
| -After MPA + $H_2O_2$ Treatment (26 hrs.) | — | <1 wt. % | 0.4 wt. % |

Example 3—Reduction of $VO^{2+}$ Species with Hydrogen Peroxide Addition

The $VO^{2+}$ species was found to be unaffected by treatment with aqueous solutions containing MPA alone. Upon addition of 3 wt. % $H_2O_2$ (based on MPA), the following extraction kinetics were observed, demonstrating significant extraction of $VO^{2+}$ within about 20 hrs. The anomalous result after 6 hrs was found to be reproducible; no satisfactory explanation is known.

TABLE III

| REDUCTION OF $VO^{2+}$ | |
|---|---|
| Time, hrs. | Relative $VO^{2+}$ Intensity |
| 0 | 84 |
| 2 | 78 |
| 4 | 74 |
| 6 | 108 |
| 20 | 38 |
| 26 | 45 |

Example 4—Effect of Catalyst Size on Vanadium Extraction

A sample of solvent-extracted, spent Co-Mo/$Al_2O_3$ catalyst was used to determine the effect of size on vanadium extraction with the heteropoly acid, molybdophosphoric acid (MPA). The vanadium extraction was determined employing (a) 1/16 inch extrudate and (b) 125 to 150 μm size powder with aqueous solutions of MPA alone and MPA+15 wt. % $H_2O_2$ 100:1 v/v. The amount of MPA in aqueous solution was 0.4 wt. %; the pH was 2.3. The extraction rates were determined in a continuous plug flow reactor maintained at 60° C. with a flow rate of 1 ml/min. Samples were collected at suitable intervals. The vanadium extracted was determined by atomic absorption spectrophotometry. The date on the percent vanadium extracted are summarized in Table IV below.

TABLE IV

| PERCENT VANADIUM EXTRACTED | | | | | | | |
|---|---|---|---|---|---|---|---|
| | | Extraction Time, hours | | | | | |
| Catalyst Size | Treatment | 2 | 4 | 6 | 8 | 10 | 12 | 15 |
| 1/16 pellet | MPA | 5 | 10 | 15 | 18 | 23 | 26 | 30 |
| 1/16 pellet | MPA + $H_2O_2$ | 15 | 30 | 41 | 51 | 57 | 62 | 66 |
| 125–150 μm | MPA | 10 | 16 | 21 | 25 | 29 | 33 | 38 |
| 125–150 μm | MPA + $H_2O_2$ | 23 | 36 | 44 | 55 | 62 | 70 | 81 |

It is clear from Table IV that (1) MPA supplemented with hydrogen peroxide is much more effective in vanadium removal than MPA alone and (2) crushing the catalyst further increases the rate of vanadium removal.

Example 5—Effect of Hydrogen Peroxide Concentration on Rate of Vanadium Extraction Toluene-extracted spent Co-Mo/Al$_2$O$_3$ catalyst was contacted with an aqueous solution of a heteropoly acid (MPA) alone and MPA supplemented with variuos concentrations of H$_2$O$_2$ in a continuous plug flow reactor maintained at 60° C. and a flow rate of 1 ml/min. The amount of MPA in aqueous solution was 0.4 wt. %; the ratio of MPA:peroxide was 100:1 v/v. Samples were collected at suitable intervals and vanadium concentration was determined by atomic absorption spectrophotometry. The data on the rate of vanadium extracted are summarized in Table V.

TABLE V

| | RATE OF VANADIUM EXTRACTED, μg/ml/min. | | | | | | | |
|---|---|---|---|---|---|---|---|---|
| | Extraction Time, hours | | | | | | | |
| Treatment | 2 | 4 | 6 | 8 | 12 | 16 | 20 | 24 |
| MPA | 42 | 46 | 54 | 58 | 68 | 76 | 86 | 84 |
| MPA + 3% H$_2$O$_2$ | 50 | 60 | 70 | 78 | 100 | 120 | 142 | 140 |
| MPA + 15% H$_2$O$_2$ | 55 | 60 | 90 | 100 | 100 | 146 | 180 | 200 |
| MPA + 30% H$_2$O$_2$ | 60 | 75 | 80 | 120 | 180 | 204 | 220 | 240 |

The data in Table V demonstrate that addition of hydrogen peroxide to the heteropoly acid enhances both the rate and amount of vanadium removal.

Example 6—Effects of Hydrogen Peroxide Concentration on Percent of Vanadium Extracted The experiment given in Example 5 was repeated, utilizing different concentrations of hydrogen peroxide with MPA. The data on the percent vanadium extracted are summarized in Table VI below.

TABLE VI

| | PERCENT VANADIUM EXTRACTED | | | | |
|---|---|---|---|---|---|
| | Extraction Time, hours | | | | |
| Treatment | 1 | 2 | 4 | 20 | 24 |
| MPA | 2 | 4 | 7.5 | 33 | 38 |
| MPA + 3% H$_2$O$_2$ | 5 | 10 | 16 | 44 | 49 |
| MPA + 9% H$_2$O$_2$ | 7 | 12 | 22 | 59 | 63 |
| MPA + 15% H$_2$O$_2$ | 10 | 23 | 43 | 73 | 80 |

Again, it is clear that addition of hydrogen peroxide to the heteropoly acid is much more effective in vanadium removal.

Example 7—Effect of Temperature on Rate of Vanadium Extraction

Toluene-extracted spent Co-Mo/Al$_2$O$_3$ hydrodesulfurization catalyst was contacted with an aqueous solution of a heteropoly acid (MPA, 0.4 wt. %) supplemented with 3 wt. % H$_2$O$_2$ 100:1 v/v. The rate of extraction of vanadium in a continuous plug flow reactor at a flow rate of 1 ml/min was determined at 50°, 60° and 70° C. Eluates were collected at suitable intervals and vanadium concentration in each fraction was determined by atomic absorption spectrophotometry. The influence of temperature on the rate of vanadium extraction is summarized in Table VII below.

TABLE VII

| | RATE OF VANADIUM EXTRACTED, μg/ml/min | | | | | | | | | |
|---|---|---|---|---|---|---|---|---|---|---|
| Temperature °C. | Extraction Time, hours | | | | | | | | | |
| | 2 | 4 | 6 | 8 | 10 | 12 | 14 | 16 | 18 | 20 | 24 |
| 50 | 17 | 20 | 32 | 37 | 40 | 44 | 46 | 48 | 50 | 50 | 50 |
| 60 | 104 | 132 | 150 | 144 | 132 | 114 | 102 | 92 | 87 | 80 | 76 |
| 70 | 150 | 182 | 202 | 200 | 188 | 180 | 172 | 164 | 154 | 144 | 128 |

From Table VII, it is clear that the increase in temperature facilitates the vandium removal. However, at temperatures much higher than about 70° C., evaporation of solvent water also becomes significant. Therefore, temperatures much above 80° C. should be avoided.

What is claimed is:

1. An improved process for regenerating spent hydrofining catalysts which comprises contacting spent catalyst with an aqueous solution of a heteropoly acid containing about 1 to 50 wt.% hydrogen peroxide, based on the amount of heteropolyacid, impregnating with a water soluble cobalt or nickel salt and calcining at a maximum temperature of about 450° C.

2. The process of claim 1 in which spent catalyst is pre-cleaned with an organic solvent.

3. The process of claim 1 in which the catalyst is impregnated with a water soluble cobalt salt.

4. The process of claim 1 in which the impregnation and calcination are repeated at least once.

5. The process of claim 1 in which the hydrofining catalyst comprises a cobalt-molybdenum loaded alumina support.

6. The process of claim 1 in which the heteropoly acid is represented by the general formula H$_x$(YM$_{1-2}$O$_{40}$), where Y is at least one element selected from the group consisting of phosphorus, silicon, titanium, germanium, arsenic zirconium, thorium and cerium, M is at least one element selected from the group consisting of molybdenum, tungsten, niobium and tantalum and x is 3 when Y is pentavalent and 4 when y is tetravalent.

7. The process of claim 6 in which Y is at least one of phosphorus and silicon and M is at least one of molybdenum and tungsten.

8. The process of claim 7 in which Y is phosphorus and M is molybdenum.

9. The process of claim 6 in which up to one-half of M is replaced by at least one element selected from the group consisting of nickel, cobalt and vanadium.

10. The process of claim 1 in which the spent catalyst is contacted with the heteropoly acid/hydrogen peroxide solution at a temperature between ambient and about 80° C.

11. The process of claim 10 in which the temperature ranges from about 30° to 60° C.

12. The process of claim 1 in which the heteropoly acid in solution ranges from about 0.1 to 25 wt. %.

13. The process of claim 12 in which the concentration ranges from about 0.2 to 6 wt. %.

14. The process of claim 12 in which the solution has a pH ranging from about 1 to 3.

15. The process of claim 13 in which the pH ranges from about 1.5 to 2.5.

16. The process of claim 1 in which the concentration of hydrogen peroxide ranges from about 3 to 15 wt. %.

17. The process of claim 16 in which the concentration of hydrogen peroxide is about 15 wt. %.

18. The process of claim 1 in which the spent catalyst is contacted by the heteropoly acid/hydrogen peroxide solution for a period of time of between about 4 and 200 hours.

19. The process of claim 18 in which the period of contact ranges from about 10 to 50 hours.

* * * * *